(12) United States Patent
Gilbertson et al.

(10) Patent No.: US 12,502,822 B2
(45) Date of Patent: Dec. 23, 2025

(54) FILM TRIMMING DEVICE AND METHOD

(71) Applicant: 3M INNOVATIVE PROPERTIES COMPANY, St. Paul, MN (US)

(72) Inventors: Mark D. Gilbertson, Burnsville, MN (US); Jason Y. Lu, Falcon Heights, MN (US); Eric L. Stiller, Howell, MI (US)

(73) Assignee: 3M Innovative Properties Company, St. Paul, MN (US)

(*) Notice: Subject to any disclaimer, the term of this patent is extended or adjusted under 35 U.S.C. 154(b) by 221 days.

(21) Appl. No.: 18/559,103

(22) PCT Filed: May 4, 2022

(86) PCT No.: PCT/IB2022/054119
§ 371 (c)(1),
(2) Date: Nov. 6, 2023

(87) PCT Pub. No.: WO2022/234479
PCT Pub. Date: Nov. 10, 2022

(65) Prior Publication Data
US 2024/0227279 A1     Jul. 11, 2024

Related U.S. Application Data

(60) Provisional application No. 63/185,249, filed on May 6, 2021.

(51) Int. Cl.
*B32B 41/00* (2006.01)
*B29C 63/00* (2006.01)
(Continued)

(52) U.S. Cl.
CPC ........ *B29C 63/481* (2013.01); *B29C 63/0004* (2013.01); *B29C 63/0082* (2013.01); *B29C 63/02* (2013.01); *B29L 2031/3005* (2013.01)

(58) Field of Classification Search
CPC .............. B29C 63/481; B29C 63/0004; B29C 63/0082; B29C 63/02; B29C 2793/0009;
(Continued)

(56) References Cited

U.S. PATENT DOCUMENTS 10,357,952 B2    7/2019   Sekanina et al.
2019/0337176 A1*   11/2019   Fujino ................... B62D 65/16

FOREIGN PATENT DOCUMENTS

JP          09226007 A     9/1997
WO     2020003133 A1    1/2020

OTHER PUBLICATIONS

International Search Report for PCT International Application No. PCT/IB2022/054119, mailed on Sep. 20, 2022, 6 pages.

* cited by examiner

*Primary Examiner* — Carson Gross
*Assistant Examiner* — Joshel Rivera
(74) *Attorney, Agent, or Firm* — Carlos M. Téllez Rodríguez; 3M Innovative Properties Company (57) ABSTRACT

Provided are devices and methods of applying a film (120) to a first panel of a vehicle wherein the first panel is connected to a second panel of the vehicle by a joint area containing a ditch portion (52) that is recessed relative to the first panel. The method includes the steps of placing into the ditch portion (52) an elongated jig (100) that comprises a shim (102) extending continuously along the length of the ditch portion (52), the shim (102) protruding above a height of the first panel, applying the film (120) to the first and second panels such that the film (120) extends over the elongated jig (100), and then using a tool (122) to apply pressure against the film (120) and toward a cutting edge of the shim (102) along the length of the shim (102) to trim the film (120) along a peripheral edge. The elongated jig (100)

(Continued)

can then be removed from the ditch portion (52), and the peripheral edge of the film (120) adhered to the ditch portion (52).

17 Claims, 7 Drawing Sheets (51) Int. Cl.
    *B29C 63/02*         (2006.01)
    *B29C 63/48*         (2006.01)
    *B29L 31/30*         (2006.01)

(58) Field of Classification Search
    CPC ....... B29C 2793/009; B29L 2031/3005; B29L 2031/3055
    USPC .................... 156/60, 64, 350, 351, 378, 379
    See application file for complete search history.

FILM TRIMMING DEVICE AND METHOD

CROSS REFERENCE TO RELATED APPLICATIONS

This application is a national stage filing under 35 U.S.C. 371 of PCT/IB2022/054119, filed May 4, 2022, which claims the benefit of Provisional Application No. 63/185,249, filed May 6, 2021, the disclosure of both is incorporated by reference in their entirety herein.

FIELD OF THE INVENTION

Provided is a jig and related methods for applying a film. The film can be, for example, an adhesive-backed film applied to an automotive exterior surface.

BACKGROUND

Automotive manufacturers use functional and decorative films for large format car body applications. The target applications areas can include the whole roof area, roof side, or the entire vehicle. Especially useful types of film are paint film and blackout film, which have potential to replace application of liquid paint in many applications. Use of these films can save significant time when compared with multiple applications of paint while avoiding emissions of volatile organic compounds. Other useful films include paint protection films that are applied over previously painted surfaces. All of these surfacing films can provide both functional and decorative benefits.

SUMMARY

Providing a consistent and high-quality result in film application can be assisted with a jig, but conventional jigs continue to present significant technical challenges. First, the exterior surface of automobiles have complex contours, which vary significantly amongst vehicle models, thus requiring different jigs for different models. Second, the application of films using conventional jigs tends to be very technique-sensitive, resulting in inconsistent wet-out of the film. Third, use of a blade to cut the film generally requires additional structure opposing the blade to guide the cut to avoid 1) risk of injury to the user and 2) potentially damaging the surface of the vehicle.

Provided herein is a trimming and application device to apply tape or film on a three-dimensional surface. This application device is a jig that includes a thin metal shim received into an elongated and flexible body capable of contouring to the 3D surface. To trim the film, a tool is pressed against the film, pressing the film into a corner of the metal shim. Advantageously, the applied pressure cuts the film without need for a sharp cutting blade. Once the film is trimmed in this manner, wet-out near the trimmed edge can proceed with help of the device's angled shelves. The angled shelves reduce tenting on the film edges by allowing sequential geometry radii to be wet-out in the proper order, limiting variability of the operator and reducing the chance of trapping air under the film during application.

Optionally, the custom cut profiles can accommodate already installed roof-ditch clips with a pocket design. The said device quickly snaps into place with its flexible design and magnetic surfaces but is not limited to such. This trimming application is not limited to roof ditch and could be used in other trim areas that do not have an exposed edge. The provided jig and method provides for an easy application with limited operator skill, reduces safety concern as there are no sharp objects, and adds repeatability as the film cutting location is fixed. This solution also reduces film trim and final wet-out time while reducing the level of skill needed by the operator.

In a first aspect, a method of applying a film to a first panel of a vehicle is provided, the first panel being connected to a second panel of the vehicle by a joint area containing a ditch portion that is recessed relative to the first panel. The method comprises: placing into the ditch portion an elongated jig that comprises a shim extending continuously along the length of the ditch portion, the shim protruding above a height of the first panel; applying the film to the first and second panels such that the film extends over the elongated jig; using a tool to apply pressure against the film and toward a cutting edge of the shim along the length of the shim to trim the film along a peripheral edge; removing the elongated jig from the ditch portion; and adhering the peripheral edge of the film to the ditch portion.

In a second aspect, a jig is provided for applying a film to a first panel of a vehicle that is connected to a second panel of the vehicle by a joint area containing a ditch portion that is recessed relative to the first panel, the jig comprising: an elongated body having a convex bottom surface complemental to the ditch portion, the elongated body having a plurality of discontinuous segments; and a shim extending continuously along the length of the elongated body, wherein the shim has a cutting edge facing away from the elongated body and having a convergence angle of from 60 degrees to 120 degrees.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

As used herein, the terms "preferred" and "preferably" refer to embodiments described herein that can afford certain benefits, under certain circumstances. However, other embodiments may also be preferred, under the same or other circumstances.

Furthermore, the recitation of one or more preferred embodiments does not imply that other embodiments are not useful and is not intended to exclude other embodiments from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises", and variations thereof do not have a limiting meaning where these terms appear in the accompanying description. Moreover, "a," "an," "the," "at least one," and "one or more" are used interchangeably herein. Relative terms such as left, right, forward, rearward, top, bottom, side, upper, lower, horizontal, vertical, and the like may be used herein and if so, are from the perspective observed in the particular drawing. These terms are used only to simplify the description, however, and not to limit the scope of the invention in any way.

Reference throughout this specification to "one embodiment," "certain embodiments," "one or more embodiments" or "an embodiment" means that a particular feature, structure, material, or characteristic described relating to the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Where applicable, trade designations are set out in all uppercase letters.

Figure 1:
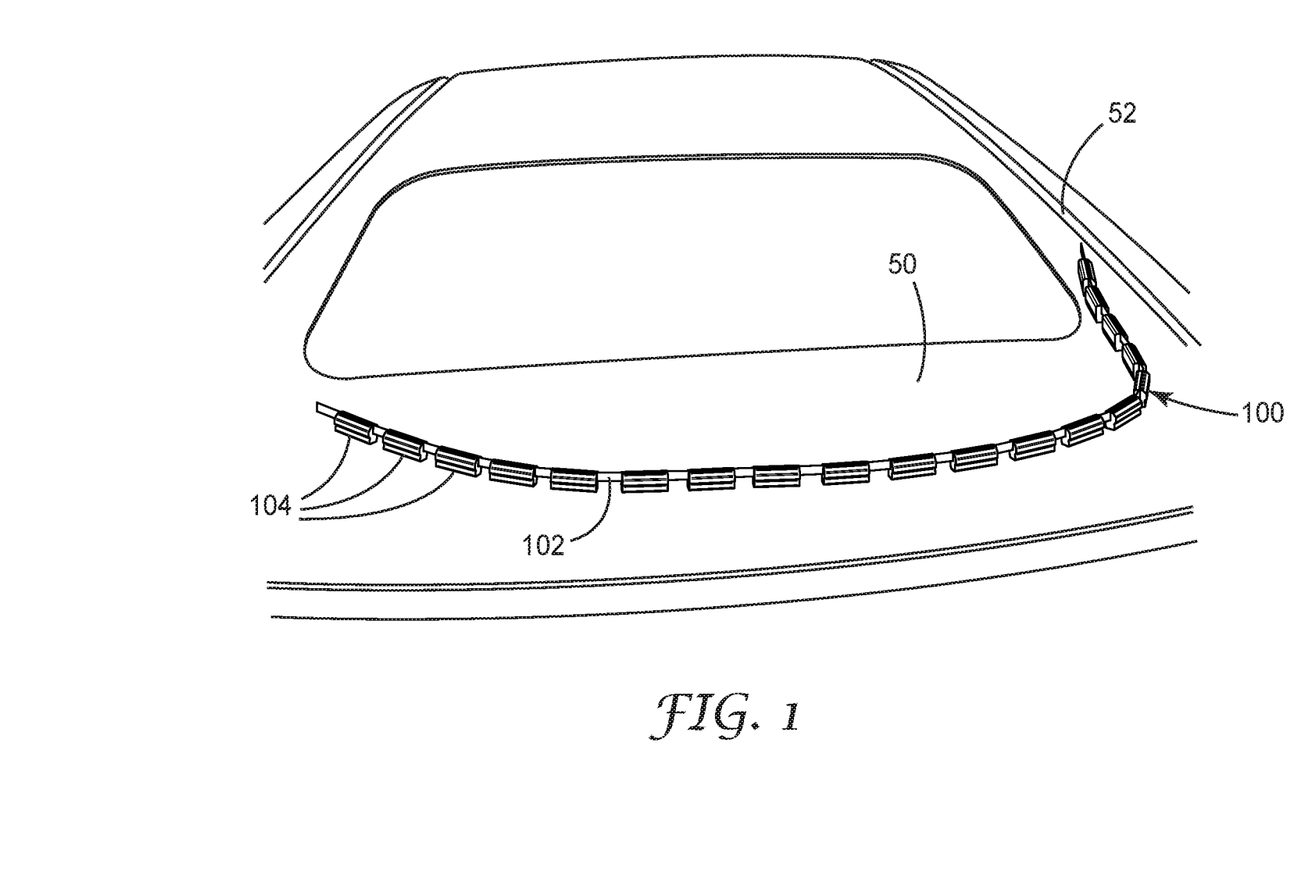
FIG. 1 is a perspective view of a jig for applying a film to a vehicle panel according to one exemplary embodiment.

A jig according to one exemplary embodiment is shown in FIG. 1 and hereinafter referred to be the numeral 100. The jig 100 has an elongated shape and is shown on top of an automotive roof panel 50 for size comparison. As depicted, the jig 100 is comprised of a continuous shim 102 (or wire) extending along the length of the jig 100 and a plurality of discontinuous segments 104 coupled to the shim 102 and distributed along its length. In a preferred embodiment, the segments 104 are joined to each other only by the shim 102. Alternatively, however, the segments 104 could also include mechanical hinges allowing adjacent segments 104 to couple to each other. Broadly, the segments 104 can be made modular in nature to accommodate different panel sizes and shapes.

While the provided embodiments are directed to the roof panel of an automobile, these could easily be applied to other panels as well. The provided jigs and methods could generally be used to facilitate the trimming of film near the roof ditch, front windshield, rear windshield, and moonroof of a vehicle. These jigs and methods also need not be limited to vehicular applications, and could be adapted for use on other large assemblies in which two or more exterior-facing panels come together along a seam that defines a registration surface.

The discontinuous nature of the segments 104 enables the relatively thin shim 102 to flexibly trace along a recessed ditch portion 52 defining a perimeter of the roof panel 50, even if the segments 104 themselves are relatively inflexible. The ditch portion 52, which will be described later in more detail, defines the boundaries of the area over which a film is to be applied. In some cases, but not necessarily all cases, the ditch portion 52 defines a boundary between contiguous panels.

For durability and strength, the shim 102 can be made from a metal, such as steel, aluminum, nitinol, copper, or alloy thereof. Preferably the metal is highly elastic and resists permanent deformation when flexed, for example, around a corner portion of a panel. The material of the shim 102 is not necessarily limited to metals, however, and can also be made from a flexible polymer or ceramic material. Optionally, the segments 104 are also at least somewhat flexible, being made from a pliable material such as a polymer, allowing flexibility and potentially lateral expansion or contraction of the material along the segments 104. Such properties can also help the segments 104 better conform to the ditch portion 52 and potentially aid in securement.

If the shim 102 is pliable, it can be possible for the shim 102 to elongate along its longitudinal axis to further assist in conforming the jig 100 to the boundaries of the roof panel 50. In some embodiments, the shim 102 can be fashioned into a continuous loop that extends along the entire perimeter of the roof panel 50. Such a shim could include one or more joints that enable segments to be reversibly attached to each other. In these embodiments, the shim itself may be segmented to enable customization in the length of the jig 100.

To assist in fitting the jig 100 to a particular panel at hand, it can be made possible for the segments 104 to be slidably movable along the shim 102 to accommodate sharper bends that might be encountered near corners of the film. The shim 102 can be made as thin as needed along its transverse direction to provide a suitable degree of flexibility. In some embodiments, the jig 100 is capable of being resiliently deflected along a bending radius down to 30 centimeters, down to 20 centimeters, or down to 10 centimeters without permanent deformation.

The segments 104 can represent any suitable portion of the overall length of the jig 100, such as from 1 percent to 90 percent, from 5 percent to 80 percent, from 10 percent to 70 percent, or in some embodiments, less than, equal to, or greater than 1 percent, 2, 3, 4, 5, 7, 10, 20, 30, 40, 50, 60, 70, 80, or 90 percent of the overall length of the jig 100.

Figure 2:
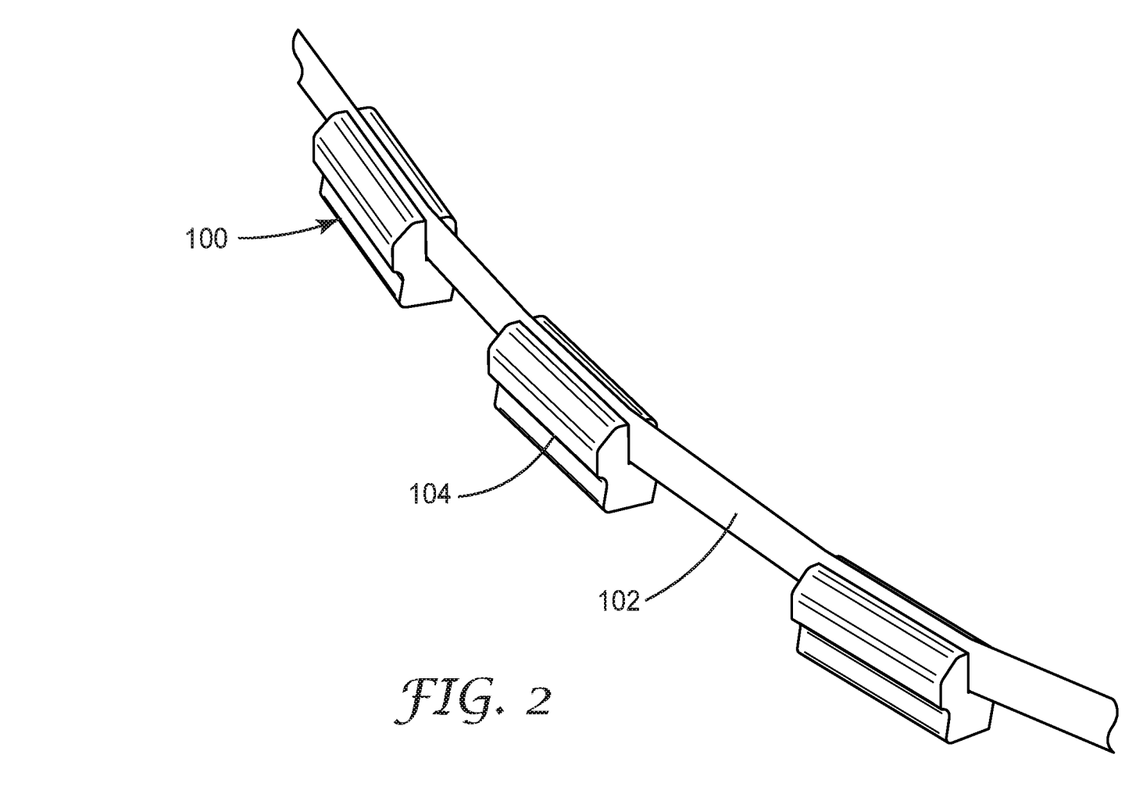
FIG. 2 is an enlarged view of the jig of FIG. 1.

FIG. 2 shows an enlarged view of the jig 100 showing its profile along its longitudinal axis. In this example, the shim 102 has a generally rectangular cross-sectional shape, where the cross-section is defined perpendicular to a longitudinal axis of the shim 102.

The shim 102 is partially embedded in each segment 104 such that one of the narrow faces of the shim 102 faces upward (i.e., away from the vehicle panel when installed) and is fully exposed along the entire length of the jig 100. It is preferable for the shim 102 to protrude above the top surface of the segments 104 by a certain amount. As an example, at least 5 percent, at least 10 percent, or at least 15 percent of the shim 102 can protrude above the segments 104.

The vertical dimension of the shim 102 is far greater than the transverse dimension, thus allowing for a high degree of flexibility along transverse directions. Non-rectangular shapes are also possible, so long as the cross-section of the shim has at least one upward-facing corner that protrudes above the segments 104, thereby providing a continuous cutting edge for the film. In one example, the upward-facing portion of the shim 102 can have a generally "D"-shaped cross-section. The cross-section of the shim 102 may or may not be uniform along its length. In some instances, the shim 102 includes one or more notches along its bottom-facing surface to facilitate bending of the shim along the plane of the roof panel 50.

Since the cross-section of the shim 102 is rectangular, each of the two cutting edges protruding above the segments 104 has by definition a convergence angle of 90 degrees, the convergence angle being defined as the angle at which the adjacent sides of the shim come together. In alternative embodiments, the one or more cutting edges can have convergence angles that deviate from 90 degrees. For instance, a given cutting edge can have a convergence angle of from 60 degrees to 120 degrees, from 60 degrees to 90 degrees, from 80 degrees to 90 degrees, or in some embodiments, less than, equal to, or greater than 60 degrees, 65, 70, 75, 80, 85, 90, 95, 100, 105, 110, 115, or 120 degrees. At least one cutting edge of the shim 102 preferably has a corner edge suitable to cut through a film, such as a corner radius of up to 400 micrometers, up to 200 micrometers, up to 100 micrometers, or up to 10 micrometers.

While not restricted, the transverse thickness of the shim 102 can be from 100 micrometers to 400 micrometers, from 120 micrometers to 350 micrometers, from 150 micrometers to 300 micrometers, or in some embodiments, less than, equal to, or greater than 100 micrometers, 105, 110, 115, 120, 125, 130, 135, 140, 145, 150, 160, 170, 180, 190, 200, 220, 240, 250, 260, 280, 300, 320, 340, 350, 360, 380, or 400 micrometers. Further, the aspect ratio (i.e., height/width) of the cross-section of the shim 102 can be from 15 to 127, from 20 to 80, from 40 to 60, or in some embodiments, less than, equal to, or greater than 15, 17, 20, 22, 25, 27, 30, 35, 40, 45, 50, 55, 60, 65, 70, 75, 80, 85, 90, 95, 100, 105, 110, 115, 120, 125, or 127.

Figure 3A:
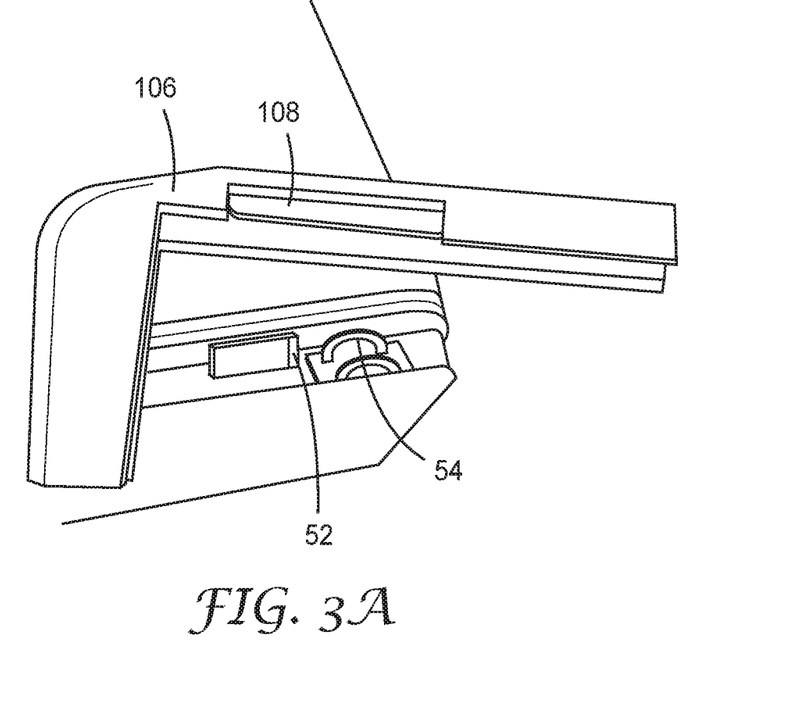
FIGS. 3A and 3B are opposing top and bottom views of a customized component optionally used with the jig of FIGS. 1-2.
Figure 3B:
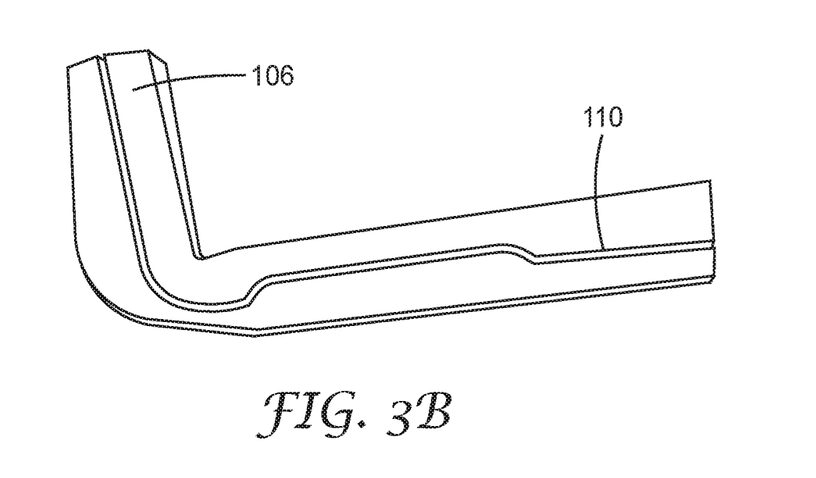

FIGS. 3A and 3B show opposing bottom and top sides of a customized segment 106 that can optionally be used in combination with the shim 102. The customized segment 106 contains a pocket 108 that provides space to accommodate any obstructions in the ditch portion 52 that would normally interfere with a segment, such as roof ditch clip 54 shown in FIG. 3A. FIG. 3B shows the upward-facing major surface of the customized segment 106, revealing a groove 110 for seating a shim (not shown in FIGS. 3A and 3B). Use of the customized segment 106 can also be advantageous in guiding the shim 102 along particularly sharp bends, such as along corner portions of the vehicle panel. While not shown here, it is possible for the customized segment 106 to have a configuration in which it mechanically attaches to the clip 54 to provide a datum point for positioning the jig 100 relative to the roof panel 50.

Figure 4:
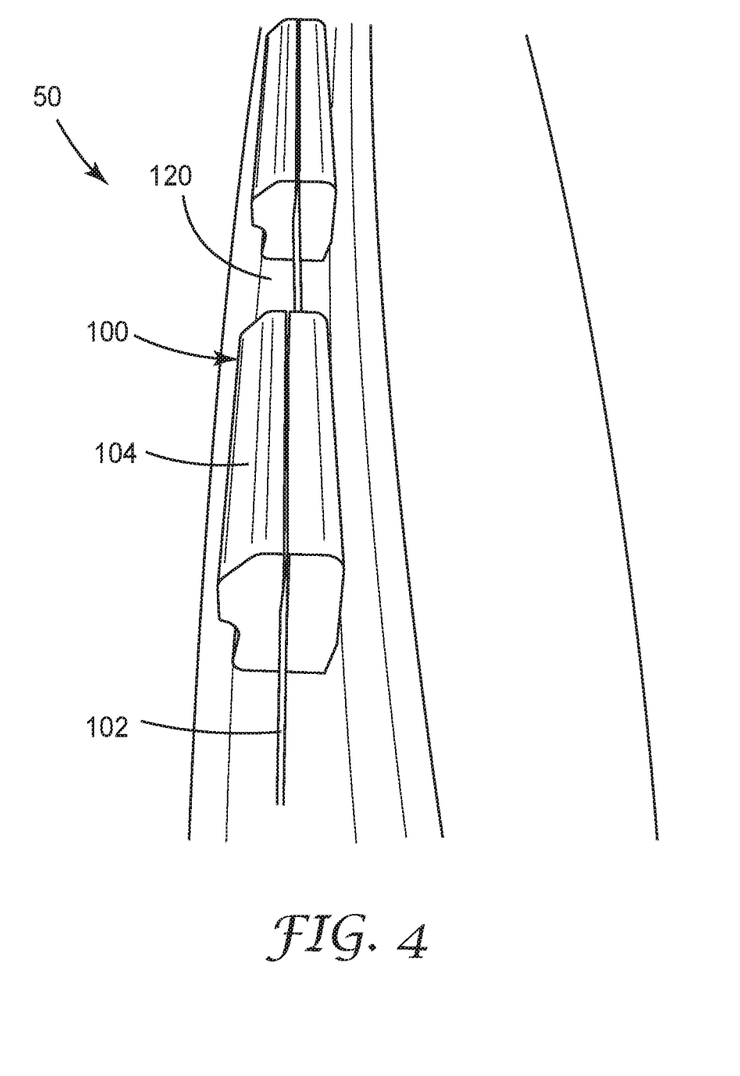
FIG. 4 is a lengthwise view of the jig of FIGS. 1-3 shown engaged to the vehicle panel.

FIG. 4 shows, in more detail, an engagement between the jig 100, including the shim 102 and segments 104, and the ditch portion 52 of the roof panel 50. While not explicitly shown, the ditch portion can extend along the boundary between two adjacent vehicle panels, for example between a roof panel and a side panel of the vehicle. In these cases, the ditch portion preferably includes surfaces that are recessed relative to both panels. The ditch portion 52, as shown, includes both concave and convex surface regions represented by a double radius. These surface regions can be complemental to mating surfaces of the segment 104.

Figure 5:
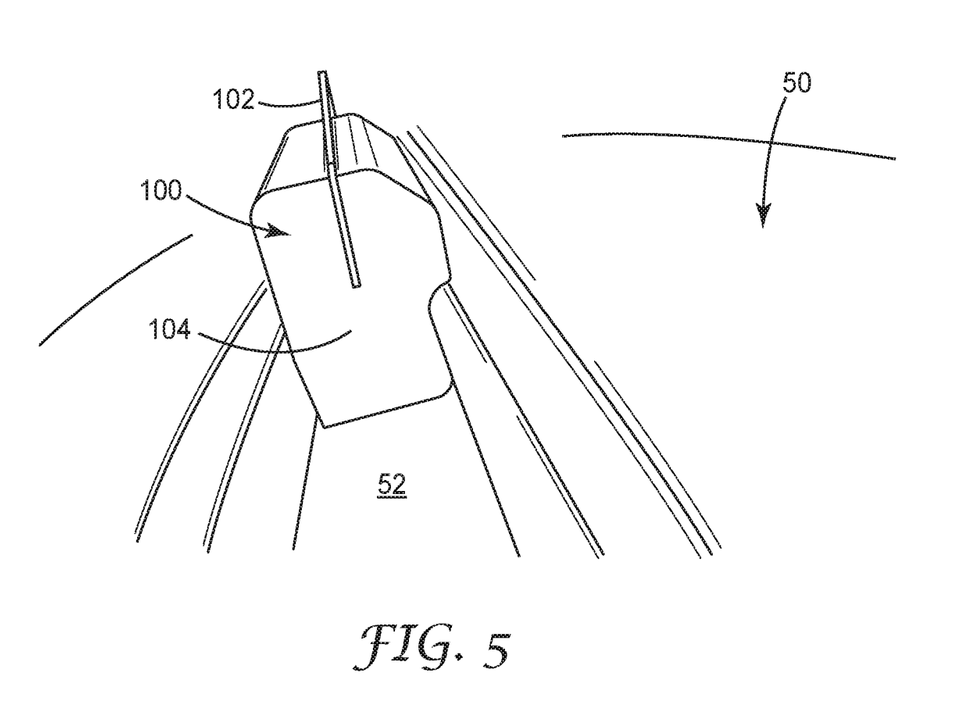
FIG. 5 is an distal view of an end segment of the jig of FIGS. 1-4 showing the engagement between the jig and the vehicle panel.

Optionally and as further shown in FIG. 5, the mating surfaces extend along at least two adjacent sides of each segment 104. These adjacent sides are generally bottom and side surfaces of the segment 104. The mating engagement between the segments 104 and the ditch portion 52 can significantly improve registration between the jig 100 and the roof panel 50. This in turn can provide a high degree of precision in the cut lines obtained using the jig 100 relative to those obtained by conventional methods.

Advantageously, each segment 104 includes an angled shelf 51 disposed between the shim 102 and the roof panel 50. After the film is cut, the angled shelf 51 can help reduce tenting on the edges of the film by allowing sequential geometry radii to be wet-out in the proper order. This reduces the chance of trapping air under the film during application. By providing for a more consistent transfer of an adhesive-backed film from the segment 104 to the roof panel 50, the angled shelf 51 can help limit variability in the quality of film application attributable to differences in operator technique.

Figure 6:
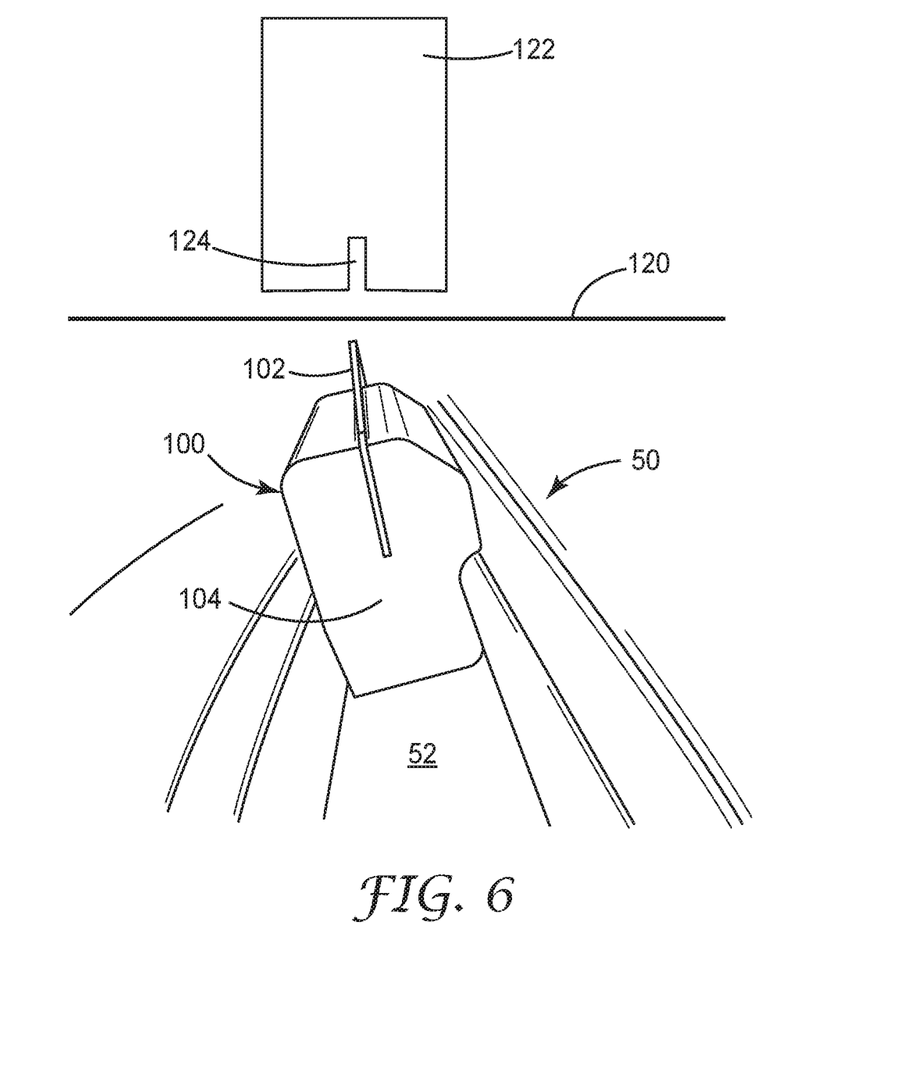
FIG. 6 is a schematic view showing use of a tool with the jig of FIGS. 1-6 of to trim the film.
Figure 7:
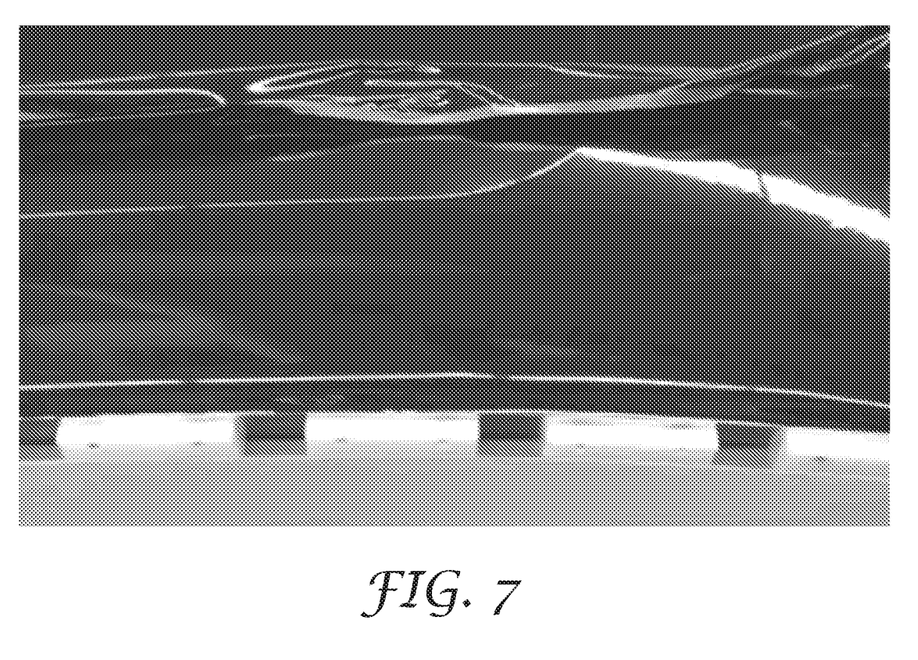
FIG. 7 is a perspective view of the jig of FIGS. 1-5 being used to apply a film to the vehicle panel.

FIG. 6 shows a schematic that illustrates a process of using the jig 100 to cut a film that is disposed on a roof panel 50. In this process, the jig 100 is placed in the ditch portion 52 of the roof panel 50 as described above. When the jig 100 is properly seated, the upward-facing surface of the shim 102 should be protruding above the height of the roof panel 50. In some embodiments, the jig 100 extends continuously along some or all of the length of the ditch portion 52. While not necessary, it is possible to use a tape or temporary adhesive to secure the jig 100 to the ditch portion 52, where the tape or adhesive is later removed.

A film 120 is then placed over both the roof panel 50 and the jig 100. It is common for the film 120 to be an adhesive-backed film, in which case the film 120 can be adhesively bonded to the roof panel 50 upon such placement. Optionally, the film 120 extends across the entirety of the roof panel 50, although this need not be required. A tool 122 can then pressed against the film 120 and translated along the shim 102, applying pressure to compress the film 120 between the tool 122 and the shim 102 to cut the film along a cutting edge of the shim 102. The tool 122 is typically pressed against the film 120 manually by a human operator but this operation could also be carried out in an automated manner, such as using a robotic arm controlled by a computer. Where a computer is used, the jig 100 could be detected using fiducial markers on the jig 100 that assist in locating its position. This cutting step can take place along a continuous loop along the perimeter of the roof panel 50 as defined by the ditch portion 52. It is also possible for the ditch portion 52 to only extend along a portion of the perimeter of the roof panel 50, in which case more than one cutting step might be required to separate the portion of the film 120 disposed on the roof panel 50 from portions of the film 120 extending beyond the roof panel 50.

Optionally and as shown, the tool 122 has a recess 124 that has a shape that is complemental to the shape of the cutting edge of the shim 102. This can prevent slippage and help ensure pressure is directed to the proper portions of the film to achieve a cleaner cut line. To facilitate cutting, the tool 122 is generally made from a slightly pliable material, relative to that of the shim 102. Such a material can be an engineering polymer such as polyoxymethylene, provided under the trade designation DELRIN by Dupont de Nemours, Inc., Wilmington, DE. In a preferred embodiment, the tool can have engagement surface with a Shore D hardness of up to 70D.

A significant technical benefit of this technique is that the cutting edge of the shim 102 does not operate like a sharp blade in the traditional sense. In various embodiments, it has a 90 degree edge that cuts the film 120 using a scissoring action or compression-based mechanism, making the operation safer for a human operator. In some embodiments, and depending on the composition of the film being trimmed, the shim 102 can be pre-heated to facilitate cutting of the film.

Further refinements are also possible in relation to the shim 102. For example, the shim 102 could be withheld inside a carrier (such as the segments 104) until the jig 100 is placed into the ditch portion 52 of the roof panel 50. The shim 102 could then be slidably urged out of the carrier when the jig 100 is fully seated into the ditch portion 52. A benefit of this configuration is that it can help avoid scratching any painted surfaces on the roof panel 50 while the jig 100 is being applied.

After the film 120 has been fully trimmed using the steps above, the jig can be removed from the ditch portion 52 of the roof panel 50. The remaining edge portion of the newly trimmed film 120 on the roof panel 50 can then adhered, as appropriate, to the portion of the ditch portion 52 where the jig 100 was vacated. The excess portion of the film 120, sometimes referred to as the "weed" portion, can then be discarded or repurposed.

Example

Objects and advantages of this disclosure are further illustrated by the following non-limiting example, but the particular materials and configurations thereof recited in this example, as well as other conditions and details, should not be construed to unduly limit this disclosure.

A jig as shown in FIGS. 2 and 4-7 was inserted into a roof ditch of a Toyota Corolla vehicle. A piece of a 3M Paint Protection Film PUL2008 obtained from 3M Company of St. Paul, MN. having a sufficient length was positioned to cover the roof ditch (containing the jig) and adhered to a first panel and second panel of the vehicle roof. The release liner was removed from the PUL2008 film prior to film's application to the panels. Then, a polyoxymethylene plastic block (obtained from DUPONT of Wilmington, DE under the trade designation DELRIN) with a recess was used to press the film into the shim of the jig which cut the film. The height of the recess was equal to the height of the exposed shim embedded in the jig. The width of the recess was designed such that it was less or equal to five times the width of the shim.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of applying a film to a first panel of a vehicle wherein the first panel is connected to a second panel of the vehicle by a joint area containing a ditch portion that is recessed relative to the first panel, the method comprising:
    placing into the ditch portion an elongated jig that comprises a shim extending continuously along the length of the ditch portion, the shim protruding above a height of the first panel;
    applying the film to the first and second panels such that the film extends over the elongated jig;
    using a tool to apply pressure against the film and toward a cutting edge of the shim along the length of the shim to trim the film along a peripheral edge;
    removing the elongated jig from the ditch portion; and
    adhering the peripheral edge of the film to the ditch portion.

2. The method of claim 1, wherein the cutting edge is oriented toward a direction away from the vehicle.

3. The method of claim 1, wherein the cutting edge of the shim has a convergence angle of from 60 degrees to 120 degrees.

4. The method of claim 3, wherein the cutting edge of the shim has convergence angle of from 60 degrees to 90 degrees.

5. The method of claim 4, wherein the cutting edge of the shim has convergence angle of from 80 degrees to 90 degrees.

6. The method of claim 1, wherein the shim has a cross-section that is generally rectangular, the cross-section being defined perpendicular to a longitudinal axis of the shim.

7. The method of claim 1, wherein the cutting edge has a radius of from 10 micrometers to 400 micrometers.

8. The method of claim 1, wherein the shim is metal.

9. The method of claim 1, wherein the ditch portion is also recessed relative to the second panel.

10. The method of claim 1, wherein the elongated jig further comprises a plurality of discontinuous segments coupled to the shim.

11. The method of claim 10, wherein the plurality of discontinuous segments are joined to each other only by the shim.

12. The method of claim 10, wherein the discontinuous segments represent up to 50 percent of the overall length of the elongated jig.

13. The method of claim 1, wherein the elongated jig is capable of being resiliently deflected along a bending radius down to 10 centimeters without permanent deformation.

14. The method of claim 1, wherein the elongated jig has a bottom surface contour that is complemental to the contour of the ditch portion.

15. The method of claim 1, wherein the tool has an engagement surface that has a shape complemental to the cutting edge of the shim.

16. The method of claim 1, wherein the tool has an engagement surface with Shore D hardness greater than 70D.

17. A jig for applying a film to a first panel of a vehicle that is connected to a second panel of the vehicle by a joint area containing a ditch portion that is recessed relative to the first panel, the jig comprising:
    an elongated body having a convex bottom surface complemental to the ditch portion, the elongated body having a plurality of discontinuous segments; and
    a shim extending continuously along the length of the elongated body, wherein the shim has a cutting edge facing away from the elongated body and having a convergence angle of from 60 degrees to 120 degrees.

\* \* \* \* \*